United States Patent [19]

Lum et al.

[11] Patent Number: 5,398,076
[45] Date of Patent: Mar. 14, 1995

[54] GAMMA CORRECTING PROCESSING OF VIDEO SIGNALS

[75] Inventors: Sanford S. Lum, Scarborough; Edward G. Callway, Toronto, both of Canada

[73] Assignee: ATI Technologies, Inc., Thornhill, Canada

[21] Appl. No.: 169,994

[22] Filed: Dec. 16, 1993

[51] Int. Cl.⁶ .............................................. H04N 5/202
[52] U.S. Cl. ................................. 348/676; 348/675
[58] Field of Search ............. 348/674, 254, 675, 676, 348/677; 358/164; H04N 5/20, 5/202

[56] References Cited

U.S. PATENT DOCUMENTS

| | | | |
|---|---|---|---|
| 3,752,905 | 8/1973 | Schneider | 348/676 |
| 4,783,703 | 11/1988 | Murakoshi et al. | 348/674 |
| 5,012,163 | 4/1991 | Alcorn et al. | 348/674 |
| 5,057,919 | 10/1991 | de Haan et al. | 348/674 |
| 5,132,796 | 7/1992 | Topper et al. | 348/674 |
| 5,175,621 | 12/1992 | Maesato | 348/674 |
| 5,196,924 | 3/1993 | Lumelsky et al. | 348/674 |

FOREIGN PATENT DOCUMENTS

| | | | |
|---|---|---|---|
| 213064 | 9/1991 | Japan | H04N 5/202 |
| 170869 | 6/1992 | Japan | H04N 5/202 |

*Primary Examiner*—James J. Groody
*Assistant Examiner*—Chris Grant
*Attorney, Agent, or Firm*—Pascal & Associates

[57] ABSTRACT

The present invention relates to a method of processing video signals comprised of gamma correcting pixel data of a first signal, gamma correcting pixel data of a second signal, adding the gamma corrected first and second signals to form a sum signal, dividing the sum signal by a factor to form a processed signal, and reverse gamma correcting the processed signal, whereby merged pixel data is produced for generation of a display.

17 Claims, 3 Drawing Sheets

GAMMA CORRECTING PROCESSING OF VIDEO SIGNALS

FIELD OF THE INVENTION

This invention relates to processing of video signals in a computer system and in particular to a method of processing of display signals while correcting for gamma distortion.

BACKGROUND TO THE INVENTION

Computer monitors have inherent non-linear intensity relationships to voltage where the voltage an input voltage to the monitor to display a particular pixel. The non-linearity is referred to as a gamma ($\gamma$) value, which when expressed as the power of a normalized voltage equals the normalized intensity. Gamma values typically range from about 1.5 to about 2.5. It has been common to correct for the non-linearity by looking up a gamma correction factor in a table for each pixel, and to adjust the voltage to be applied to the monitor in accordance with the gamma correction factor.

In addition, since the eye perceives intensity level ratios, rather than their absolute values, the intensity Levels should be incremented logarithmically, rather than linearly. Gamma correction thus takes into account the intensity ratios that the eye can perceive when controlling the voltage applied to the computer monitor.

A discussion of gamma correction in computer monitors may be found in the textbook "Fundamentals of Interactive Computer Graphics" by J. D. Foley and A. Van Damm, copyright 1982 by Addison-Wesley Publishing Company, pp. 594–597.

Most computer systems use an RGB color model, which represents color intensities in ranges of discrete voltages presented to red, green and blue electron gun control circuitry of e.g. a picture tube. In a YIQ color model, intensity is represented only by the Y component.

Normally, in drawn computer images gamma effects are not visible because the drawn images are typically pre-gamma corrected by the artist who selected gamma corrected colors when drawing. Digitized video is also usually pre-gamma corrected. However when images are to be resampled for resizing, or when video special effects are to be utilized such as fade-into another image, pixel arithmetic arises. The result of the pixel arithmetic can have visible deleterious effects in the displayed picture.

FIG. 1 is a graph of normalized pixel intensity for normalized voltage of a monitor. The curve 1 illustrates idealized linear intensity while the curve 2 illustrates gamma corrected intensity for a given voltage. Curve 3 illustrates the absolute gamma error, for which it may be seen that maximum gamma error occurs at a normalized voltage of about 0.5 V. There is no error at zero intensity and at full intensity.

While the graph of FIG. 1 appears to indicate that maximum error occurs at 50% of full scale voltage, this does not represent what effects occur when various intensities are added together.

FIG. 2 is a graph illustrating a percentage error of the intensity value represented by the absolute error. Exponential curve 4 results. It may be seen that the error approaches infinity as the voltage approaches zero (at zero there is a discontinuity where the error becomes zero). The percentage error only drops to relatively low levels when the normalized voltage reaches 0.9.

Thus it may be seen that low intensity signals are affected the most. While one would expect a marginal effect on most images because the focus of the picture tends to be toward the brighter parts, when adding two images, either both with low intensity or one with low intensity, the result is errors in both brightness and color, the latter since each color component may have a different gamma error. The result, particularly when images are added e.g. fading one image into another image, can be incorrect color and brightness.

In addition, drawn images tend to have saturated colors wherein they have intensities of either zero or 1 (maximum) while digitized images tend to have more intermediate values. Digitized images also tend to locality of brightness and color, i.e. a pixel will tend to have brightness and color close to that of the pixels surrounding it. This tends to hide the error because it will be smoothed away, but the images are incorrect. Nevertheless, experimental evidence shows that gamma error is most visible and pronounced on a RGB monitor, wherein a drawn image with high frequency components is mathematically processed.

It should be noted that if gamma correction is applied to the sum signal of two signals that are merged, this will not correct the more significant error of the low intensity signal. If the gamma correction of the sum signal were corrected in accordance with the gamma error of the low level signal, the high level signal will be corrected to an incorrect gamma correction factor.

To illustrate this, FIG. 3 is a graph of probability of error resulting from the combination of digitized video and a drawn image. The probability of a pixel or pixel component being at a particular intensity is illustrated as curves 6 and 7, which generally follow the form of curve 3 of FIG. 1. Curves 8 and 9 are intensity vs error curves. Thus it may be seen that greater error occurs at lower intensities of pixels or pixel components, and thus drawn images (curve 7) would tend to exhibit visible effects of this error, whereas video images (curve 6) would not. FIG. 3 is not drawn to vertical scale for any of the curves.

SUMMARY OF THE INVENTION

The present invention is a method of processing video signals which substantially reduces gamma errors resulting from the combination of plural signals.

In accordance with an embodiment of the invention, a method of processing video signals is comprised of gamma correcting pixel data of a first signal, gamma correcting pixel data of a second signal, adding the gamma corrected first and second signals to form a sum signal, averaging the sum signal, and reverse gamma correcting the averaged sum signal whereby merged pixel data is produced for generation of a display.

In accordance with another embodiment, a method of processing digital video signals is comprised of separately gamma correcting pixel data of individual pixels of plural video signals, adding the gamma corrected pixel data to form a sum signal for each pixel to be displayed, averaging each of the sum signals, and reverse gamma correcting each of the averaged sum signals, whereby merged pixel data is produced for generation of a display.

BRIEF INTRODUCTION TO THE DRAWINGS

A better understanding of the invention will be obtained by reference to the detailed description below, in conjunction with the following drawings, in which:

FIG. 1 is a graph of normalized intensity vs normalized voltage of a monitor showing linear intensity, gamma corrected intensity and absolute error, FIG. 2 is a graph of percentage error and absolute gamma error vs normalized voltage, FIG. 3 is a graph of probability of a pixel or pixel component being at a particular intensity, and intensity vs error, for drawn and video images, FIG. 4 is a block diagram of a structure on which the present invention can operate, FIG. 5 is a block diagram illustrating an embodiment of the present invention, FIG. 6 is a block diagram illustrating a more specific form of the present invention, and FIG. 7 is a graph of table index vs corrected intensity voltage for two gamma values.

DETAILED DESCRIPTION OF THE PRESENT INVENTION

Figure 4:
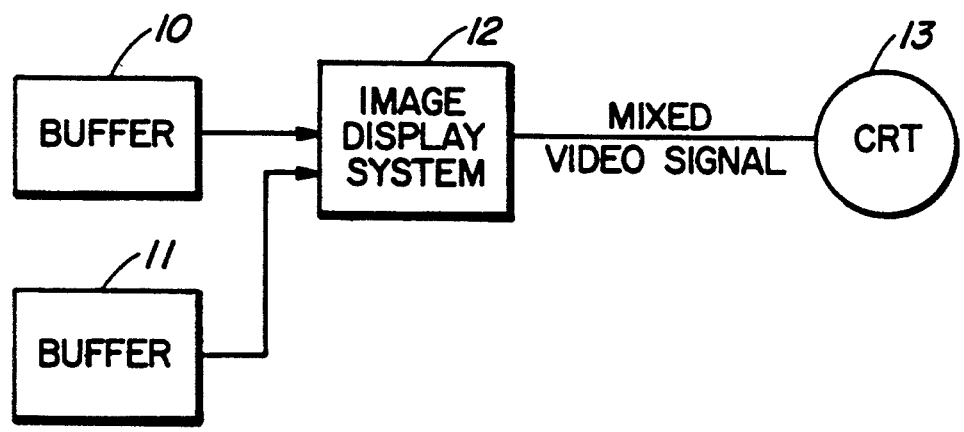

Turning to FIG. 4, each of a pair of buffers 10 and 11 contains pixel data of particular images which are to be processed, in this example super-imposed (added). Buffer 10, for example, can be a refresh buffer of the computer and buffer 11 can be a buffer holding pixel data of another image, such as a video signal. Alternatively, buffer 11 can be dispensed with and replaced with an input from a video signal source.

The outputs of buffers 10 and 11 are connected to inputs of an image display system 12. The output of the image display system 12 provides an image display signal which is comprised of a mixed video signal, and is applied to a video monitor 13, indicated as CRT in FIG. 4.

The image display system obtains from buffer 10 the pixel values (separate R, G and B values) of an RGB type image, or the Y (and I and Q) components of a YIQ color model. The image display system also obtains similar data relating to the second video signal from buffer 11, or if an analog video signal replaces the signal from buffer 11, image display system 12 derives the RGB or Y pixel values therefrom.

To provide a video superimposed process, the following algorithm is processed $$D = \frac{P + Q}{2}$$

where P is a corresponding intensity component of a pixel (a pixel color in RGB) from the first image, Q is a corresponding intensity component (of a particular color) of the corresponding pixel from the second image, and D is a resulting intensity component of a destination pixel.

In accordance with the present invention, the operands P and Q are gamma adjusted prior to being operated upon. The gamma corrected pixel values are then added and averaged. In the present case there are two signals and therefore the two gamma corrected signals are added together and the sum is divided by 2.

Following averaging of the sum, the result is reverse gamma corrected to obtain a linear value for that pixel. The equation of the entire process is $$D = \left[ \frac{P^\gamma + Q^\gamma}{2} \right]^{1/\gamma}$$

where $\gamma$ is a gamma constant.

The result is a destination pixel which can be maintained as substantially true, even when two signals which have different intensities are added together.

In general, where $$D = \frac{P + Q}{2},$$

which is not gamma corrected, and $$D = \left[ \frac{P^\gamma + Q^\gamma}{2} \right]^{1/\gamma},$$

which is gamma corrected, or $$D = \frac{aP + bQ}{16},$$

which is not gamma corrected, and $$D = \left[ \frac{aP^\gamma + Q^\gamma}{16} \right]^{1/\gamma},$$

which is gamma corrected (where a and b are multiplication coefficients) denote any arbitrary equations which do pixel arithmetic. However, any algorithm which will provide the result described herein is included within the present invention.

Figure 5:
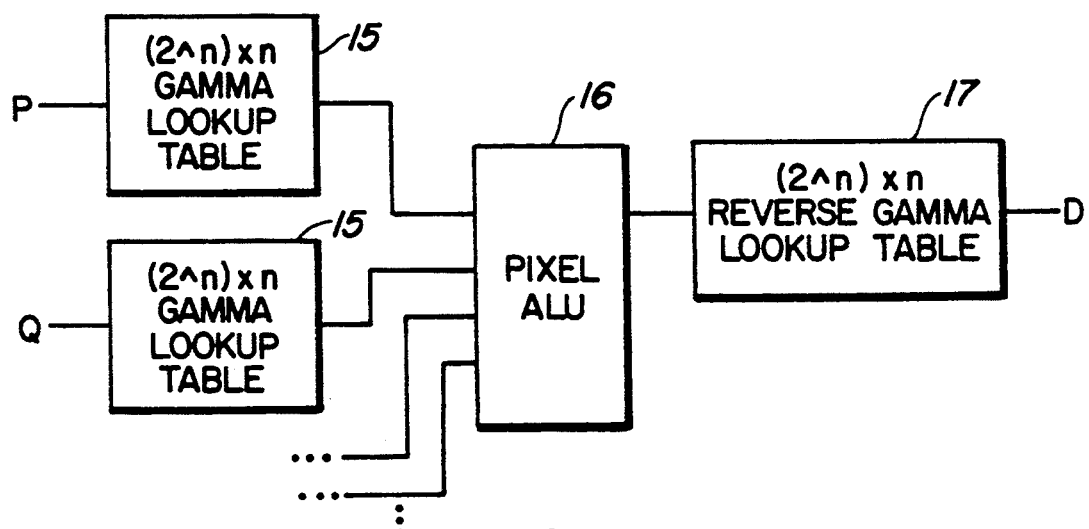

FIG. 5 illustrates an embodiment of the present invention. Each component of an RGB pixel, or the Y component of a YIQ pixel, is characterized by an intensity level. The intensity of each is looked up in a lookup table 15 to retrieve a gamma correction factor. The data entries in each of the gamma lookup tables must be identical. The intensity levels of the source are then modified in accordance with the retrieved gamma correction factors.

Figure 6:
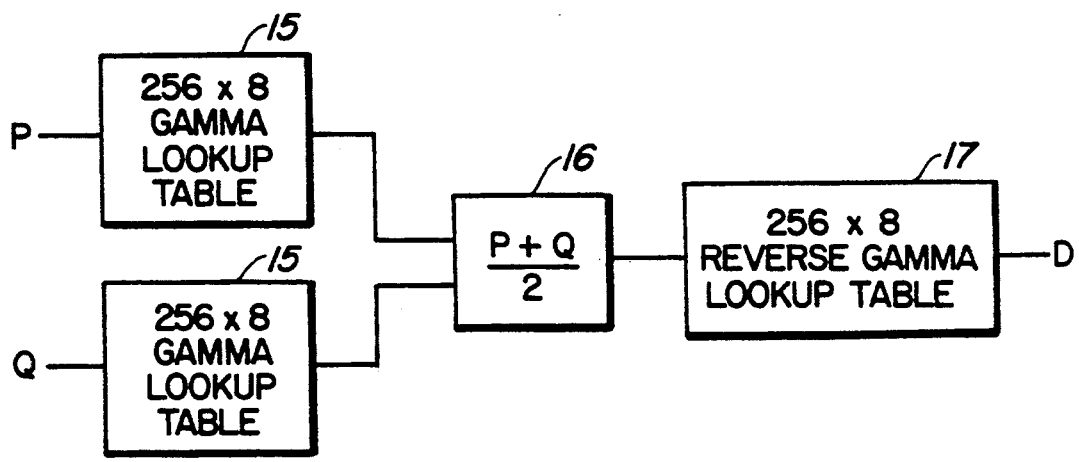

FIG. 6 illustrates a more specific form of the invention in which, rather than the generalized case as in FIG. 5, two signals P and Q are being superimposed. In the embodiment of FIG. 6 the integers are 8 bit, which will result in 256 possible intensity levels. Thus there will be a 256 row lookup table required for each signal (which may be the same table).

Returning to FIG. 5, the pixel values are corrected by the gamma correction factor and are then operated upon in the pixel ALU (arithmetic and logic unit) 16. In the embodiment of FIG. 6 the ALU is shown to perform the summing and averaging of two gamma corrected pixel values $$\frac{P + Q}{2}$$

to obtain the sum and average of the two signals.

The pixel value of the averaged sum signal for each pixel of the RGB signal (or Y signal) is then looked up in reverse gamma lookup table 17, and the pixel value corrected in accordance therewith. An output signal D results, which is the reverse gamma corrected averaged sum signal, and which can be used to generate a pixel on a display.

Gamma table values are computed for 8 bit integers from:

$$\text{Gamma table value} = \left[\frac{\text{index}}{255}\right]^{\gamma} \times 255$$

$$\text{Reverse Gamma table value} = \left[\frac{\text{index}}{255}\right]^{1/\gamma} \times 255$$

In the general case, for an n bit integer, the number 255 should be replaced with m, where $m=2^n-1$.

Using a gamma of 2.2 and trying all possible values of P and Q in the averaging function, maximum absolute error was found to be 58 without gamma correction and 14 with gamma correction.

It was found in a laboratory prototype that the maximum absolute error could be reduced still further by manual adjustment of the gamma tables.

Manual adjustment of the gamma table yielded a maximum absolute error of 7.

Figure 1:
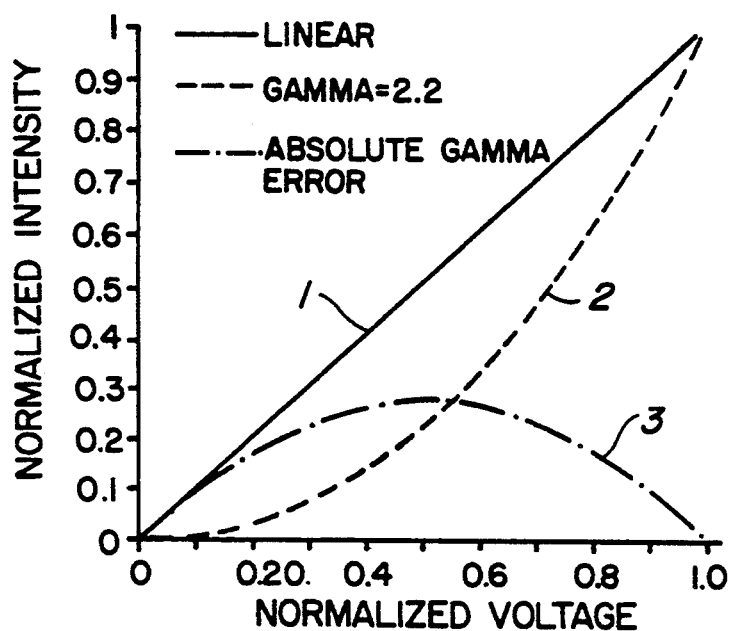
Figure 2:
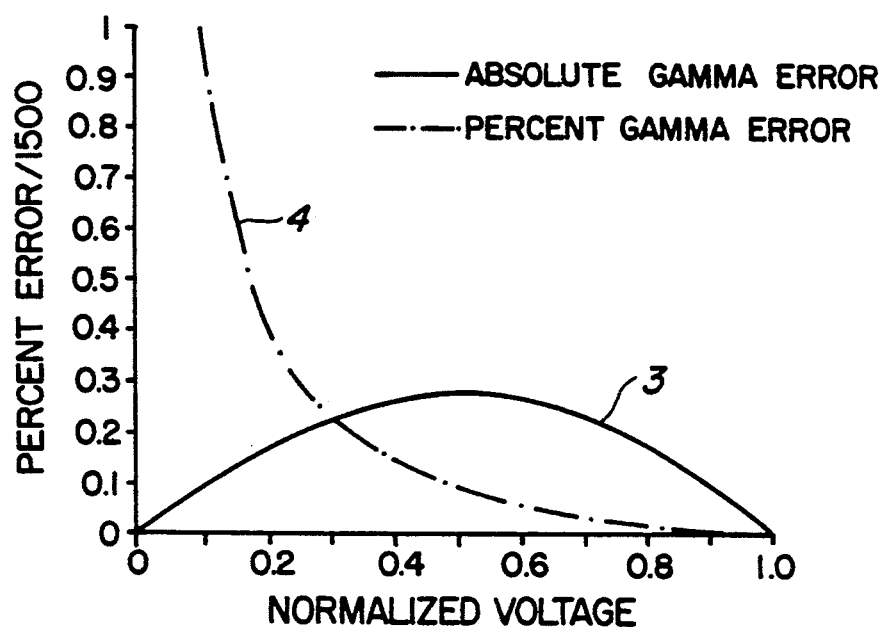
Figure 3:
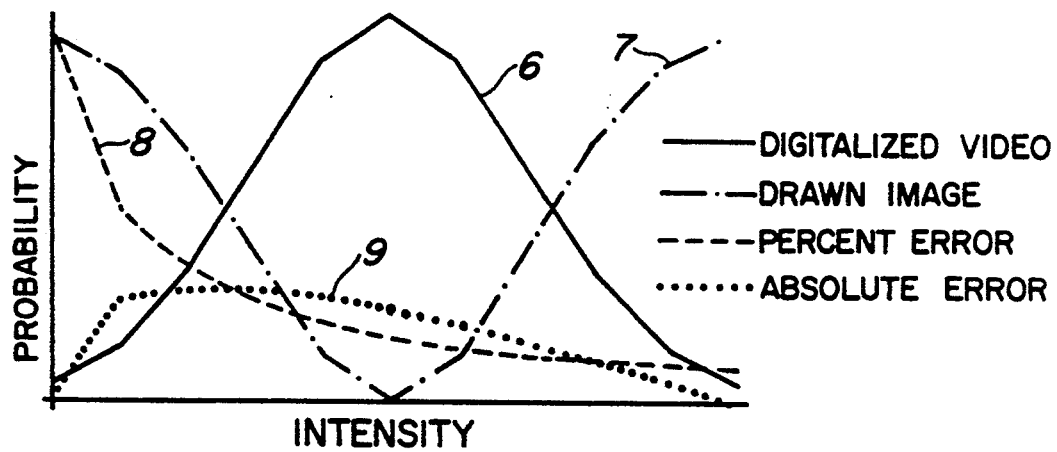

Bits of $\text{Error}_{no\ gamma} = \log_2(\text{MaxError}) = \log_2(58) = 5.86$ Bits of $\text{Error}_{gamma=2.2} = \log_2(\text{MaxError}) = \log_2(7) = 2.81$ Maximum error tended to occur for low values of P and Q because the percentage error in the forward gamma conversion is very high for small numbers. FIG. 1 illustrates this; for very small voltages, the real intensity is very small. When discretized, the value goes to zero. This error decreases as gamma decreases because the percentage error decreases. For a gamma of 1.5, the maximum absolute error was found to be 3 with gamma correction and 33 without gamma correction.

Bits of $\text{Error}_{no\ gamma} = \log_2(\text{MaxError}) = \log_2(33) = 5.04$ Bits of $\text{Error}_{gamma=1.5} = \log_2(\text{MaxError}) = \log_2(3) = 1.58$ Example gamma and reverse gamma tables are listed below for the first 32 entries. All other entries are identical and can be obtained from calculation.

| | Gamma = 2.2 Calculated | | | |
|---|---|---|---|---|
| Index | Gamma Corrected Intensity | Reverse Gamma Corrected Intensity | Gamma | Adjusted Reverse Gamma |
| 0 | 0 | 0 | 0 | 0 |
| 1 | 0 | 21 | 0 | 13 |
| 2 | 0 | 28 | 0 | 23 |
| 3 | 0 | 34 | 0 | 31 |
| 4 | 0 | 39 | 0 | 39 |
| 5 | 0 | 43 | 0 | 43 |
| 6 | 0 | 46 | 0 | 46 |
| 7 | 0 | 50 | 0 | 50 |
| 8 | 0 | 53 | 1 | 53 |
| 9 | 0 | 56 | 1 | 56 |
| 10 | 0 | 59 | 1 | 59 |
| 11 | 0 | 61 | 1 | 61 |
| 12 | 0 | 64 | 1 | 64 |
| 13 | 0 | 66 | 1 | 66 |
| 14 | 0 | 68 | 1 | 68 |
| 15 | 1 | 70 | 1 | 70 |
| 16 | 1 | 72 | 1 | 72 |
| 17 | 1 | 74 | 1 | 74 |
| 18 | 1 | 76 | 1 | 76 |
| 19 | 1 | 78 | 1 | 78 |
| 20 | 1 | 80 | 1 | 80 |
| 21 | 1 | 82 | 2 | 82 |
| 22 | 1 | 84 | 2 | 84 |
| 23 | 1 | 85 | 2 | 85 |
| 24 | 1 | 87 | 2 | 87 |
| 25 | 2 | 89 | 2 | 89 |
| 26 | 2 | 90 | 2 | 90 |
| 27 | 2 | 92 | 2 | 92 |
| 28 | 2 | 93 | 3 | 93 |
| 29 | 2 | 95 | 3 | 95 |
| 30 | 2 | 96 | 3 | 96 |
| 31 | 2 | 98 | 3 | 98 |

From the above unadjusted table, errors are high because small signals go to zero and are lost in the calculation and reverse gamma conversion. The table was manually adjusted to minimize the maximum error. By observation, the same effect can be achieved by using a gamma of 1.3 for all intensities below a value of 4 in the table calculations. This has the effect of enhancing the small signals yet not losing the gamma effect in the reverse gamma calculation.

Figure 7:
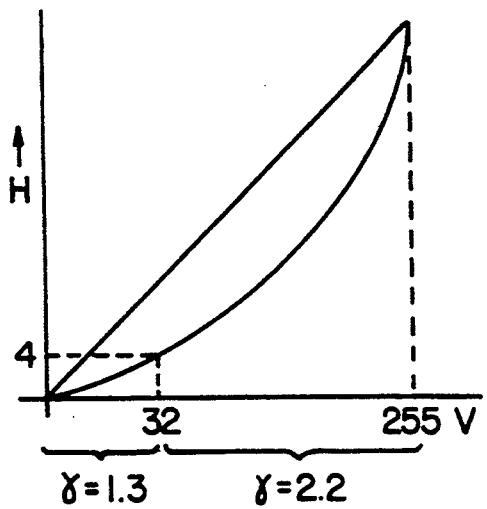

FIG. 7 illustrates what was just described for adjusting gamma and reverse gamma values in the lookup table for small values. Care should be taken to ensure that no discontinuity occurs when the $\gamma=1.3$ curve meets the $\gamma=2.2$ curve.

The invention can be used for merging of two or more images, image filtering with 2D or IIR filters, and image scaling with color interpolating or color averaging, for example.

A person understanding this invention may now conceive of alternative structures and embodiments or variations of the above. All of those which fall within the scope of the claims appended hereto are considered to be part of the present invention.

We claim:

1. A method of processing video signals comprising:
   (a) gamma correcting pixel data of a first signal,
   (b) gamma correcting pixel data of a second signal,
   (c) adding the gamma corrected first and second signals to form a sum signal,
   (d) dividing the sum signal by a factor to form a processed signal, and
   (e) reverse gamma correcting the processed signal, whereby merged pixel data is produced for generation of a display.

2. A method as defined in claim 1 in which said factor is 16.

3. A method as defined in claim 1 in which said factor is an averaging factor.

4. A method as defined in claim 1 in which the pixel data of the first and second signals relate to single pixels of each of said first and second signals.

5. A method as defined in claim 1 in which the gamma correction of the first signal is effected by retrieving a gamma correction factor from a first table, in which the gamma correction of the second signal is effected by retrieving a gamma correction factor from a second table which is identical to the first table, and in which the reverse gamma correction is effected by retrieving a reverse gamma correcting factor from a further table, and operating on a first, second and processed sum signals by respective gamma correction factors retrieved from said tables.

6. A method as defined in claim 5 in which the first and second tables are formed by storing a single array of gamma correction values in a memory which is accessed to retrieve said gamma correction factors.

7. A method as defined in claim 5 in which gamma correction factors for the first and second signals stored in the first and second tables are derived by computing the algorithm $$TV_1 = \left[\frac{I}{m}\right]^{\gamma} \times m$$

where
TV$_1$ is a table value,
I is an index value,
m is a number of pixel intensity levels (intensity resolution) desired,
$\gamma$ is a gamma constant,
and in which the reverse gamma correction factors for the average sum signal stored in the further table are derived by computing the algorithm $$TV_2 = \left[\frac{I}{m}\right]^{1/\gamma} \times m$$

where TV$_2$ is a table value.

8. A method as defined in claim 7 in which the gamma correction factors are modified by manual adjustment to minimize absolute gamma error.

9. A method of processing digital video signals comprising:

(a) separately gamma correcting pixel data of individual pixels of plural video signals,
(b) adding the gamma corrected pixel data to form a sum signal for each pixel to be displayed,
(c) dividing each of the sum signals by a factor, to form processed signals, and
(d) reverse gamma correcting each of the processed signals,
whereby merged pixel data is produced for generation of a display.

10. A method as defined in claim 9 in which the gamma correcting step is effected on each red, blue and green pixel of each video signal for generation of an RGB type display.

11. A method as defined in claim 9 in which the gamma correcting step is effected on the Y value of each individual pixel of each video signal for generation of a YIQ type display, in which the adding step is effected by separately adding the gamma corrected Y values of each pixel of each video signal, and in which the reverse gamma correcting step is effected by reverse gamma correcting each separate averaged pixel sum of the Y values.

12. A method as defined in claim 10 in which gamma correcting values for the plural video signals are retrieved from one or more tables for providing identical gamma correcting factors for each intensity level of a particular color for each video signal.

13. A method as defined in claim 11 in which gamma correcting values for the plural video signals are retrieved from one or more tables for providing identical gamma correcting factors for each intensity level of a particular Y value for each video signal.

14. A method as defined in claim 12 in which reverse gamma correcting values are retrieved from a table.

15. A method as defined in claim 13 in which reverse gamma correcting values are retrieved from a table.

16. A method as defined in claim 7 in which the gamma correction factors defining a first gamma curve are modified automatically by a first predetermined factor below a predetermined index and by a second predetermined factor above the predetermined index defining a second gamma curve, and ensuring that there is no discontinuity between functions of said gamma curves.

17. A method s defined in claim 16 in which the first factor is 1.3 and the second factor is 2.2.

* * * * *